M. O. BERTHOLD.
INDUCTION MOTOR.
APPLICATION FILED JUNE 5, 1908.
998,868.
Patented July 25, 1911.
2 SHEETS—SHEET 2.
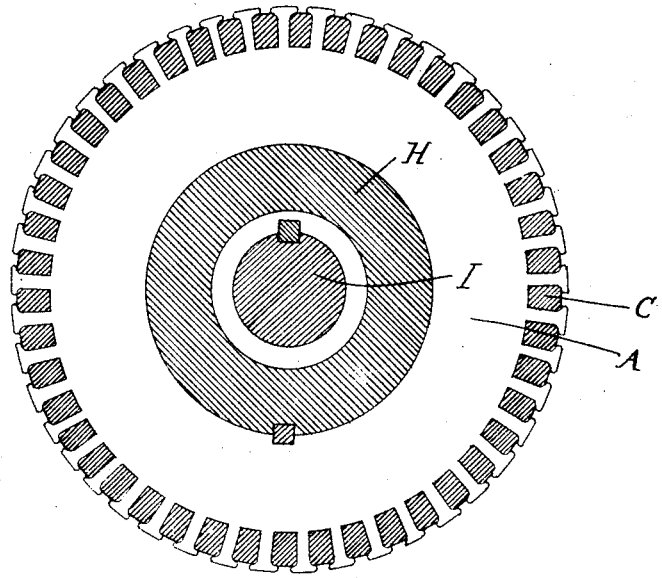
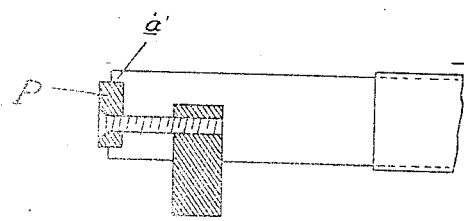
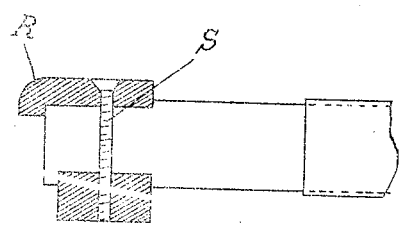
Witnesses
Inventor
Martin O. Berthold
By
attys

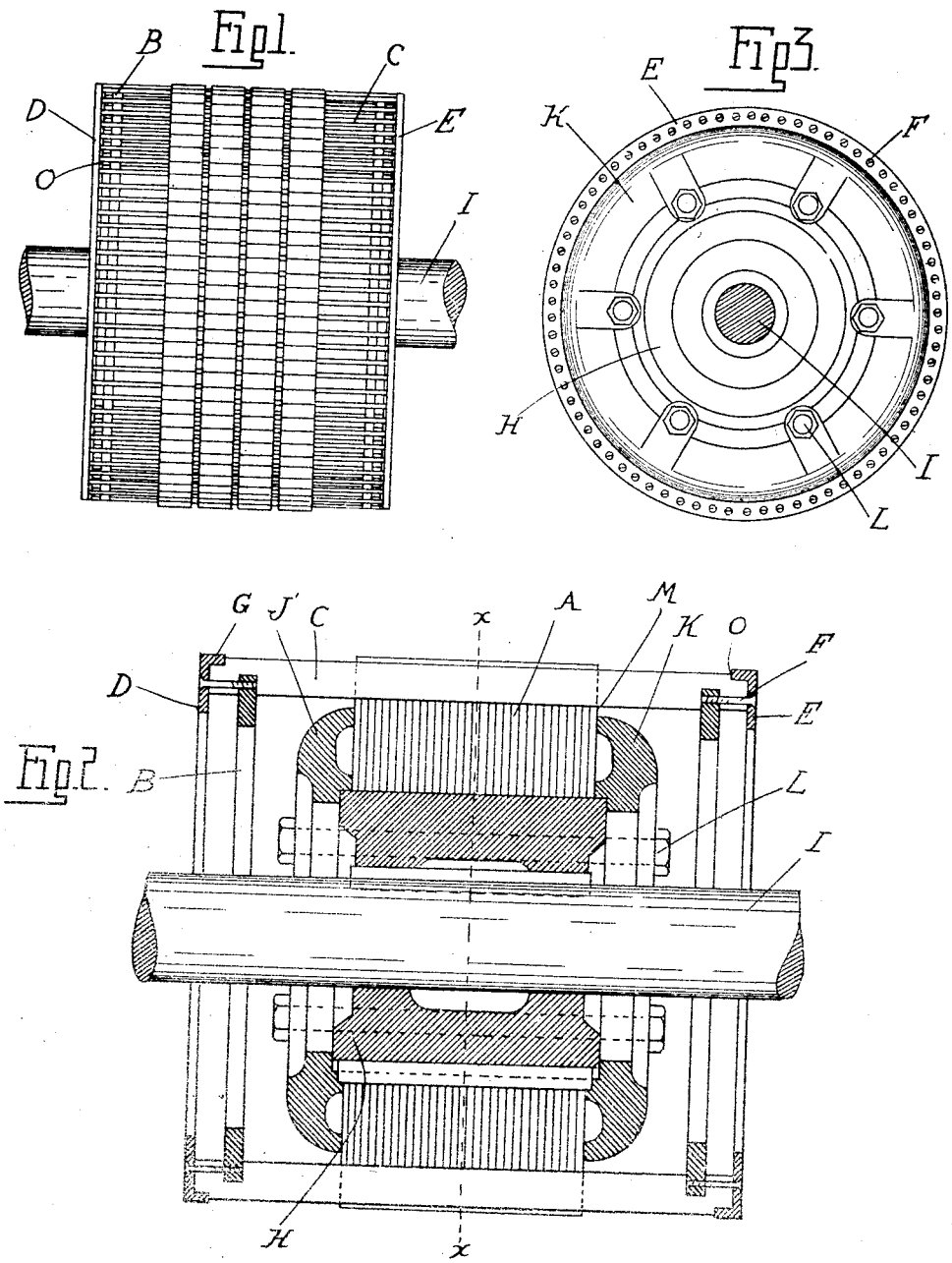

UNITED STATES PATENT OFFICE.

MARTIN O. BERTHOLD, OF INDIANAPOLIS, INDIANA, ASSIGNOR TO FAIRBANKS-MORSE ELECTRICAL MANUFACTURING COMPANY, OF INDIANAPOLIS, INDIANA, A CORPORATION OF INDIANA.

INDUCTION-MOTOR.

998,868.  Specification of Letters Patent.  Patented July 25, 1911.

Application filed June 5, 1908. Serial No. 436,854.

*To all whom it may concern:*

Be it known that I, MARTIN O. BERTHOLD, a subject of the Emperor of Germany, residing at Indianapolis, in the county of Marion and State of Indiana, have invented certain new and useful Improvements in Induction-Motors, of which the following is a specification, reference being had therein to the accompanying drawings.

The invention has particular reference to rotors for induction motors, and consists in an electrical appliance of this character having a maximum amount of ventilation and a more uniform radiation of heat.

The invention also consists in retaining means for the conducting bars, serving to prevent the latter becoming loose under the vibration and centrifugal motion, thereby maintaining the conductivity in the joints under all conditions in use, and it further consists in a novel form of joint between the bars and short-circuiting devices having the same or greater conducting area than the cross section of the bar, whereby overheating and consequent impairment is obviated.

The invention still further consists in the peculiar arrangement and combination of the various parts of the rotor, and in certain details of construction, as will be more fully hereinafter set forth.

In the drawings,—Figure 1 is a side elevation of my improved rotor; Fig. 2 is a vertical central section therethrough; Fig. 3 is an end view; Fig. 4 is a cross section on line $x$—$x$ of Fig 2; and Figs. 5 and 6 are sectional views illustrating modifications of the end rings for the rotor.

In general, the rotor is of the well known squirrel-cage type, comprising a suitable core A, short-circuiting rings B of appropriate conducting material arranged at the core ends, and longitudinal conducting bars C extending circumferentially about the core and contacting with the rings. In its improved form the rotor is provided with a considerably greater number of longitudinal bars than heretofore employed, and these in turn are fashioned into thin flat conductors as illustrated, which when assembled produce a better and more uniformly ventilated structure, producing a maximum dissipation of heat. The rotor bars described are connected to the short-circuiting rings in the manner indicated in Fig. 2, each bar being notched adjacent its opposite ends to embrace the rings and the joints soldered to produce an electrical connection between the parts.

It is well recognized in rotor construction that the greatest difficulty is experienced in maintaining the conductivity in the joints between the rotor bars and short circuiting rings, even when the number of bars is relatively small and their cross section large, and this difficulty is obviously increased when the number of conductors is relatively large, as in the present construction of rotor, and their cross sectional area too small to permit of bolting in place. Furthermore, with the ordinary form of joint between a thin flat conductor as described and its contacting ring the conductivity of the joint would be less than that of the cross section of the bar, and the structure liable to overheating at the joint and consequent impairment. To obviate these difficulties I provide electrical connections between each bar and the complementary rings in addition to the ordinary joint, which connections with the bar contacts provide not less than the same, and in most instances several times greater, conductivity in the joint than in the bar itself, so that overheating of the joint is effectively prevented. The same means that form the electrical connection also preferably constitute the mechanical coupling which positively holds the bars in contact with the short-circuiting rings, and thus serves to maintain under all conditions of use the conductivity in the joints. The electrical connections referred to are formed by means of end rings D E arranged beyond the short-circuiting rings, and spaced a slight distance therefrom. Each longitudinal conductor extends beyond the main short-circuiting rings, as shown, a slight distance, and its free end is squared, so that the bar end will contact with the outer ring. The rings in turn are preferably held in place by means of bolts or screws F which extend through the outer rings and engage the short-circuiting rings, as shown. The rotor is in this manner provided with a second set of short-circuiting rings, namely, the outer members; the projecting portions of the longitudinal conductors are clamped between the rings by the bolts or screws, and the latter are preferably made of conducting material so as to form electrical connections between the rings which they connect. Each of the outer rings described i provided with an inwardly extending annular flange G, the rings constituting cap members which embrace the end portion of the longitudinal conductors, as shown, thus holding the latter in place and preventing any possibility of the bars working loose, and at the same time the flanges which are formed integral with the outer rings form a part of the electrical connections, increasing the conductivity of the joint.

The preferable construction of rotor comprises a hub section H keyed to the rotor shaft I, and the core is of the laminated type, arranged upon the hub section as shown and tightly clamped between the flanges J' and K, which are held together by suitable bolts L. The conducting bars are preferably arranged in longitudinal recesses M formed in the core, and the ends of the bars on their upper sides are notched, as at O, the notches forming an annular seat which receives the flange of the end retaining ring.

In the modification illustrated in Fig. 5 the outer rings P are positioned within annular seats formed by recesses a' in the conductor bar ends. The additional contact is thus provided, and the ring also serves as a retaining means, preventing the dislodgment of the rotor bars.

In Fig. 6 the outer ring is designated by the reference-letter R. In this instance, it encircles the end portions of the longitudinal bars, and the connecting devices S for the rings extend intermediate of the bars in right angular relation thereto, instead of relatively longitudinally as in the other instances. From this construction, it will be obvious that the same functions are performed by the outer rings as in the other cases previously described.

In describing the conducting bars, the word end is used in the specification and claims as referring to the cross-sectional surface at the extremity of the bar, or the bar end proper; in contradistinction to that portion of the bar adjacent its end.

What I claim as my invention is,—

1. A rotor, comprising a core, short-circuiting rings adjacent the core ends, longitudinally-extending conducting bars contacting with and projecting beyond the rings, conducting rings engaging the bar ends, and connections of conducting material between the rings.

2. A rotor, comprising a core, a circumferential series of longitudinal conducting bars thereon, short-circuiting rings for the bars positioned within the series, in proximity to its ends, conducting rings engaging the bar ends and forming retaining means for the bars, and connections of conducting material between the rings.

3. A rotor comprising a core, a circumferential series of longitudinal conducting bars engaging the core and projecting beyond the ends thereof, the ends of said bars being recessed, short circuiting rings positioned within the series of bars in proximity to its ends, and continuous conducting rings of angular cross section abutting the bar ends, the transverse portion of each of said rings engaging the recesses in said bars and forming a retaining means for the bars.

4. A rotor comprising a core, a circumferential series of longitudinal conducting bars, engaging the core and projecting beyond the ends thereof, said bars being transversely recessed in proximity to their ends and having their ends also recessed, short circuiting rings positioned within the series of bars and engaging the transverse recesses thereof, and continuous conducting rings of angular cross section abutting the bar ends, the laterally projecting portions of said rings engaging the recesses in the ends of the bars and forming a retaining means for said bars.

5. A rotor, comprising a core, a circumferential series of longitudinal conducting bars engaging the core and projecting beyond the ends thereof, said bars being transversely recessed in proximity to their ends and having their ends also recessed, short-circuiting rings positioned within the series of bars and engaging said transverse recesses, conducting rings engaging the bar ends and having laterally projecting portions engaging the recesses in the ends of the bars forming a retaining means for said bars, and connections of conducting material for clamping the rings together.

6. A rotor comprising a core, a circular series of longitudinally extending conducting bars, short circuiting rings adjacent the bar extremities, and continuous conducting rings of angular cross section fitted on the bar ends, said rings abutting the bar ends and overlying the portions of the bars adjacent the ends thereof.

7. A rotor, comprising a core, a circumferential series of longitudinally conducting bars thereon, short circuiting rings for the bars positioned within the series in proximity to its ends, conducting rings provided with portions abutting the bar ends and with portions overlying the tops of the bars adjacent the ends thereof, and means connecting said short circuiting rings and said conducting rings.

In testimony whereof I affix my signature in presence of two witnesses.

MARTIN O. BERTHOLD.

Witnesses:
SAML. LEE HADLEY,
ERNEST G. COX.